Nov. 18, 1958  J. R. LUNEAU ET AL  2,861,203
TORQUER
Filed July 25, 1956  3 Sheets-Sheet 1
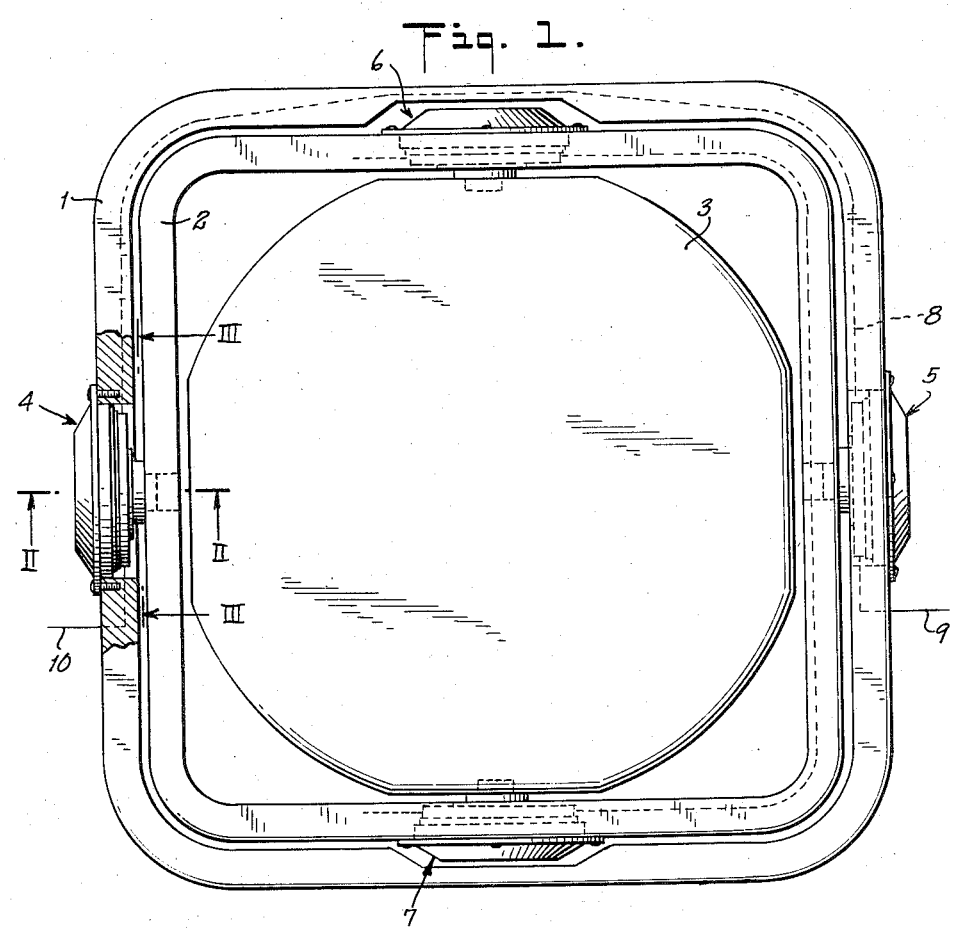
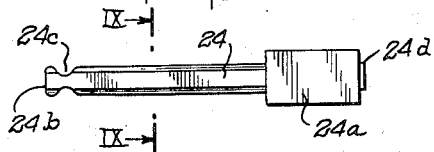
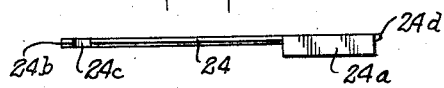
INVENTORS
JOHN R. LUNEAU
BY CHRISTIAN H. H. UNRUH
Robert S. Dunham
ATTORNEY Nov. 18, 1958   J. R. LUNEAU ET AL   2,861,203
TORQUER
Filed July 25, 1956   3 Sheets-Sheet 2
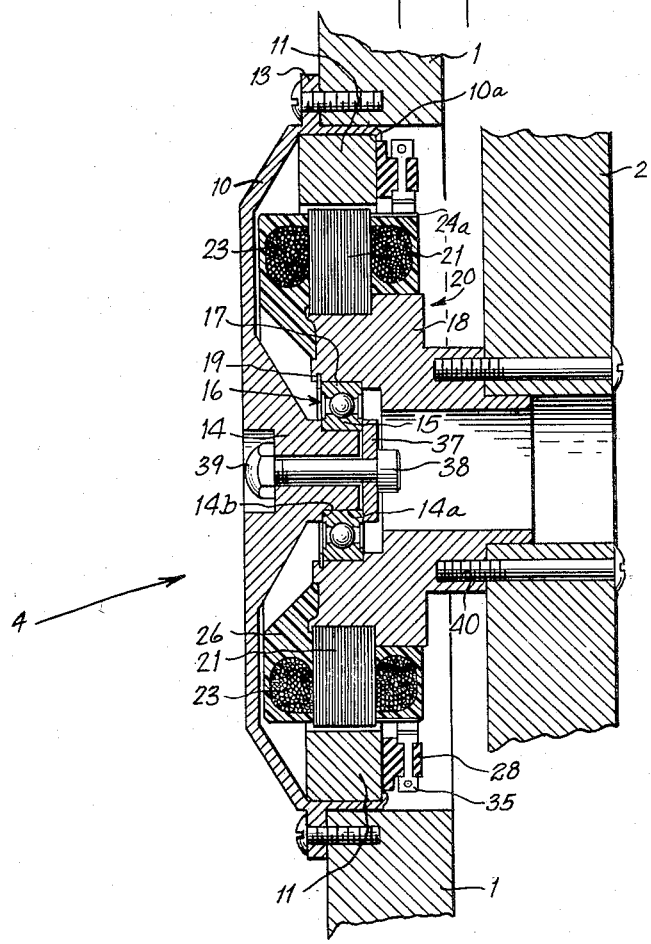
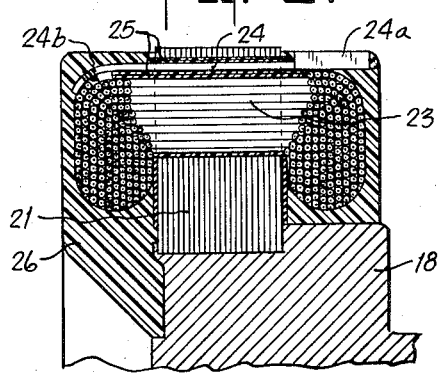
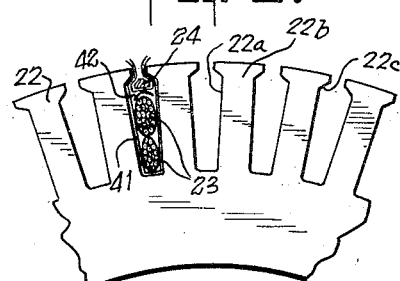
INVENTORS
JOHN R. LUNEAU
BY CHRISTIAN H. H. UNRUH
Robert S. Dunham
ATTORNEY

INVENTORS
JOHN R. LUNEAU
BY CHRISTIAN H. H. UNRUH

Robert S. Dunham
ATTORNEY

United States Patent Office 2,861,203
Patented Nov. 18, 1958

2,861,203

TORQUER

John R. Luneau, Nanuet, and Christian H. H. Unruh, Suffern, N. Y., assignors to Inland Motor Corporation, Pearl River, N. Y., a corporation of New York Application July 25, 1956, Serial No. 600,120

9 Claims. (Cl. 310—40)

This invention relates to torquers, and particularly to electrical torque motors for applying a substantial torque between two relatively movable members. It is illustrated herein as applied to a leveling support such as a gimbal supporting a gyroscope, a camera mount, or the like, wherein the rate of relative movement produced by operation of the torquer is small. While the invention has particular utility in connection with such devices, many features of it may be applied to other structures including those where a somewhat larger rate of movement is required.

In many modern devices, it is desirable to have a torque producing device which is compact and light in weight, efficient with respect to its power requirements, and rapid in response to an energizing signal. These requirements are particularly severe in the case of torque motors for maintaining the level of stabilized platforms on aircraft or naval vessels. Such a torque motor or torquer is mounted between the platform and its underlying support in a manner to apply a tilting torque to the platform. The supply of energy to the torquer is in turn controlled by a gyroscope or other level responsive device mounted on the platform, which device commonly acts through a suitable amplifier. The platform supporting structure in which the torquer is mounted is commonly a gimbal suspension. Such gyroscopes and stabilized platforms are used for navigational purposes, for fire control, or for other purposes.

In any of the applications mentioned, it is necessary that the device respond rapidly to applied signals, in order to keep the platform as level as possible, and to maintain accuracy of the navigation and fire control. Furthermore, particularly in the case of aircraft equipment, it is necessary that the weight, size and power requirements of the torque applying device be minimized.

Some of the difficulties encountered with torque motors of the prior art have been the weight, lost motion, and slow response due to high inertia, which accompany the use of a gear train between the motor and the element to which the torque is applied.

An object of the present invention is to provide an improved torque applying device of the type described.

An object of the invention is to provide an improved electric torquer.

Another object is to provide an improved gimbal suspension and torque applying means for use in such a suspension.

Another object is to provide an improved torque motor having relatively movable armature and field structures, each adapted to be connected, without the use of a gear train or other intervening elements directly to supporting and supported parts.

Other objects are to provide improved armature and field structures for electric machines, particularly suited for use in electric torquers of the type described.

The foregoing objects of the invention are attained in the apparatus described herein, which includes a field structure fixed in a housing adapted for mounting on one of two elements which are to be relatively moved. The field structure includes a continuous ring defining the outside of an air gap of an electrical motor. This continuous ring is of magnetic material and is provided on its outer surface with a plurality of recesses for receiving permanent magnets. The ring and magnet assembly are received within a cup-shaped housing and are permanently fastened therein. The housing has a peripheral flange by which it is mounted on said one element to which torque is to be applied. The housing is provided with a central arbor extending along the housing axis, which is also the axis of the field structure.

An armature cooperates with the field and comprises a hollow hub mounted on the arbor by means of a single bearing located substantially at the center of gravity of the armature. A laminated magnetic core is mounted on the hub and is provided on its periphery with slots for receiving an armature winding. The coils of the winding are held in the slots by means of wedge bars of copper or other suitable electrically conductive material. These bars have end portions which project beyond the ends of the slot. At one end, the projecting portions of the bars are extended from the slots circumferentially of the armature and serve as commutator bars. The opposite ends of the bars are connected electrically to the coils of the winding. The portions of the bars inside the slots are insulated from the core and from the adjacent winding coils.

Two such torquers may be provided on the diametrically opposite supports of a gimbal mount. When so provided, the armature windings may be connected electrically in series to ensure that both torquers respond concurrently.

Other objects and advantages of our invention will become apparent from the following description and claims, taken together with the accompanying drawings.

In the drawings:

Fig. 1 is a somewhat diagrammatic plan view of a gimbal suspension embodying certain features of the invention;

Fig. 2 is a cross-sectional view taken on the line II—II of Fig. 1, on an enlarged scale;

Fig. 5 is a fragmentary view similar to Fig. 2, but on a more enlarged scale, showing the details of the armature construction;

Fig. 6 is a fragmentary elevational view of the armature showing the details of coils and wedge bars in one of the slots;

Fig. 7 is a plan view of a wedge and commutator bar as used in the armature;

Fig. 8 is an elevational view of the wedge of Fig. 7; and

Fig. 9 is a cross-sectional view on the line IX—IX of Fig. 7, on an enlarged scale.

Figure 3:
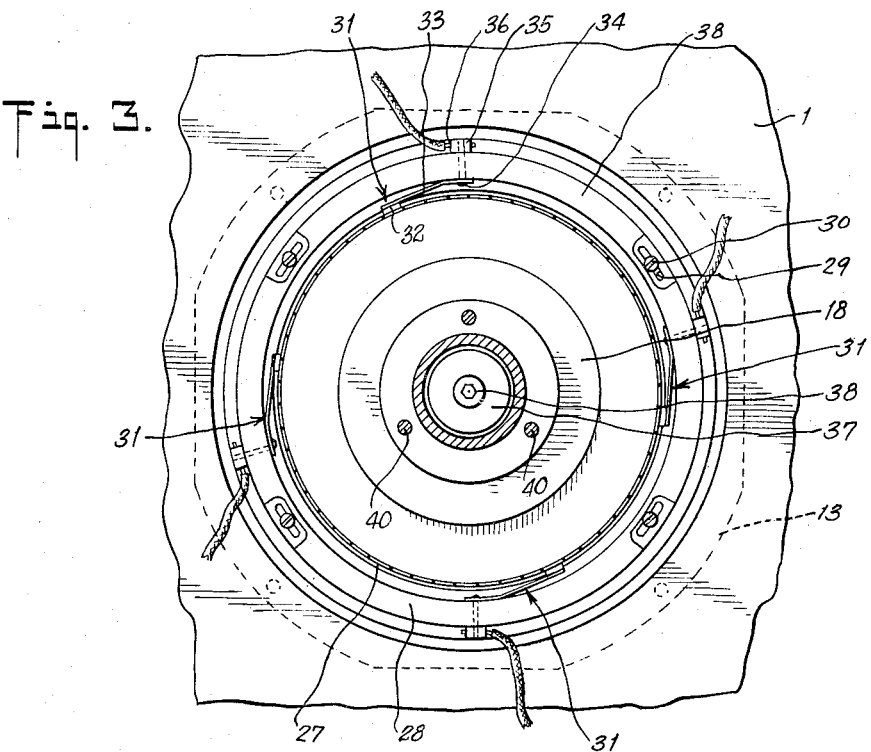
Fig. 3 is an elevational view of a single torquer, taken on the line III—III of Fig. 1, with parts of the gimbal suspension omitted.
Figure 4:
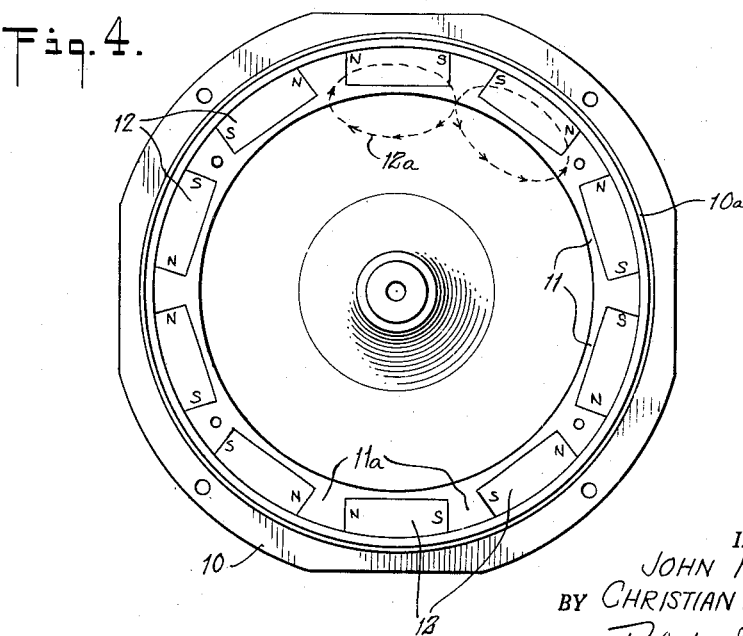
Fig. 4 is a view similar to Fig. 3 with the brush supporting ring and its related parts removed, to show the details of the field structure.

There is shown in Fig. 1 a gimbal mount including an outer ring 1, an inner ring 2, and a supported platform 3. The inner ring 2 is mounted on the outer ring 1 by means of two diametrically opposite torquers 4 and 5. A more conventional arrangement would have only one torquer at one side of the ring. The details of the construction of one of these torquers are illustrated below in Figs. 2 to 9. The platform 3 is mounted on the inner ring 2 by means of two diametrically opposite torquers 6 and 7. The axis of the torquers 6 and 7 is at right angles to the axis of the torquers 4 and 5. The armature windings of the torquers 4 and 5 are connected in series by means of a wire 8 and their opposite terminals are connected to line wires 9 and 10. While this connection is preferred, other types of electrical connection and energization of the two windings may be used, including, for example, push-pull connections, or alternatively, energization of one torquer for one direction of torque and the other for the opposite direction. In a similar manner the armature windings of the torquers 6 and 7 are connected in series. Energy is supplied to the torquers from any suitable control system of conventional type, which responds to a deviation of the platform 3 from the horizontal.

Typically, such a control system includes a gyroscope and a pickup which responds to a shifting of the angular position of the axis of the gyroscope with respect to its support, which may be the platform 3.

The details of construction of the four torquers 4, 5, 6 and 7 are all similar. Those details will be described below in the case of the torquer 4.

Figs. 2 to 9

The torquer 4 includes a field structure comprising a cup-shaped housing 10, a magnetic ring 11 (see Fig. 4) and a plurality of permanent magnets 12, which are located in recesses formed in the outer periphery of the ring 11. Note that the inner periphery of the ring 11 is continuous and that there are no gaps in it. The recesses are separated by teeth 11a on the ring 11, which serve as pole pieces for the magnets 12. The magnets 12 are polarized circumferentially of the ring 11, as indicated by the legends on Fig. 4, so as to create a magnetic flux pattern as there diagrammatically illustrated by the elliptical lines 12a. The outer sides of the magnets 12 are contoured to cooperate with the ring 11 to form a smooth cylindrical surface. The ring 11 and the magnets 12 are assembled in the housing 10, which is provided on the periphery of its open side with a lip or flange 10a which is spun over after the ring 11 and magnets 12 are inserted in the housing, and is thereafter effective to maintain the ring and magnets of the field structure permanently in place in the housing. The housing 10 is provided with a peripheral flange 13, by which it may be mounted on the gimbal ring 1 by means of suitable bolts.

At the center of the cup-shaped housing 10 there is provided an inwardly and axially extending arbor 14. On the outer surface of the arbor 14, adjacent its inner end, there is provided a seat 14a for the inner race 15 of a ball bearing generally indicated at 16. The seat 14a terminates at a shoulder 14b on arbor 14, which shoulder establishes the axial position of the race 15.

The inner race 15 of the bearing 16 is held in place on the armature 14 by a clamping plate 37, which is held by a bolt 38 which extends through and along the axis of the arbor 14 and a cooperating nut 39.

The bearing 16 has an outer race 17 which is held in place on a suitable seat on a hollow hub 18 by means of a snap ring 19. The hub 18 carries the armature of the torquer.

The armature, which is generally indicated by the reference numeral 20, includes a core 21 comprising stacked laminations. One of the laminations is illustrated in detail at 22 in Fig. 6. As there shown, it may be seen that the lamination is provided with a plurality of slots 22a, and that the teeth 22b between the slots are provided at their outer ends with shoulders 22c which overhang the slots 22a.

The coils 23 of an electrical winding are received in the slots 22a in a conventional fashion, illustrated somewhat diagrammatically in Fig. 5. For reasons discussed below, it is preferred to use a wave winding of conventional form. The coils 23 are held in place in the slots by means of wedge bars 24. Each bar 24 serves both as a wedge for retaining the coils 23 in a slot, and also serves as a commutator segment. Each bar 24 is insulated by means of a suitable covering 25 of insulating material, such as sheet mica, from the adjacent parts of the core 21 and the coils 23. One end 24a of each bar 24 projects substantially beyond the core 21. The end 24a is substantially wider and thicker than the wedge portion of the bar 24, as best shown in Figs. 7 and 8. The other end 24b of each bar 24a projects beyond the core 21 on the other side and is provided near its end with recesses 24c, which facilitate the attachment of the wires of the coils 23, by means of the usual soldered connection.

The preferred form of insulation of the coils 23 and the bars 24 is illustrated in Figs. 5 and 6, where the dimensions have been exaggerated for purposes of clarity. Before assembling the coils 23 in a slot, a first sheet 41 of insulating material is placed in the slot with its edges extending out between the teeth 22b. The coils 23 are then placed inside the sheet 41. Over the top or outer side of the coils is placed another sheet 42 of insulating material. A third sheet 43 is placed over the sheet 42 and extends over the shoulders 22c and out through the slot 22a between the teeth 22b. After the third sheet 43 is in place, the bar 24 is inserted, and is insulated from the core 22 and the coils 23 by two layers of insulation. Any suitable insulating material may be used. It is presently preferred to use a polyester resin plastic material made and sold by Du Pont under the name "Mylar."

The outer end of the commutator bar portion 24a is provided with a projecting tip or lug 24d.

After the windings and bars 24 are assembled with the core 21 on the hub 18, the peripheral parts of the unit, i. e., all parts except the hub 18, are encapsulated in a plastic matrix, illustrated at 26 in Fig. 5. This plastic matrix serves to hold the parts in place against localized twisting forces. Since the torquer moves only at relatively low rates, the centrifugal forces acting on the armature are relatively small as compared to conventional motors, and the encapsulating plastic matrix 26 is sufficient to hold the parts in place against the twisting forces encountered.

The bars 24 are formed as stampings from sheet material, and the projecting ends 24a are then flat. After assembly and encapsulation, the ends 24a are turned down on a lathe to make the outer surfaces of the bars 24a arcuate.

The commutator, comprising the plurality of bar ends 24a, is indicated generally in Fig. 3 by the reference numeral 27. As best seen in Figs. 2 and 3, there is fastened on the ring 11 a brush supporting ring 28. The ring 28 is provided with four mounting slots 29 which receive screws 30 threaded into the magnetic ring 11. The screws 30 and slots 29 permit angular adjustment of the mounting ring 28. The mounting ring 28 carries four brushes 31, each consisting of a contact 32 fixed on the end of a leaf spring 33. The leaf spring 33 has its opposite end attached to a pin 34 which extends through the brush mounting ring 28 and carries on its outer end a lug 35 apertured to receive and fasten the end of a wire 36.

With a wave winding, only two brushes are required for operation of the motor. However, for safety reasons, it is preferred to use four brushes, each pair of like polarity brushes being connected electrically in parallel. If the contact at any brush is disturbed, by dirt or for any other reason, the torquer will continue to operate through its parallel brush.

The hub 18 is provided on its inner end with a suitable number (shown as three) of threaded holes 40 for receiving screws which pass through a suitable mounting flange or other part of the gimbal ring 2.

In conventional electric motors, where the armature is intended to rotate at substantial rates, it is desirable to have air gaps between the poles of the field and to place the brushes so that they are electrically connected to the particular coil sides which are located under the air gaps between the poles. The purpose of this is to obtain good commutation, i. e., to minimize the sparking at the brushes.

This sparking at the brushes is increased by armature reaction, which may be described as a magnetic field set up by the current flowing through the coils of the armature. This field is in quadrature with the main field, and therefore generates voltages in the coils undergoing commutation, which voltages are proportional to rotational velocity. In order to reduce the armature reaction field, it is customary to provide interpolar space in the flux path of that field. However, since in the machine of the present invention the armature moves only at very low rates, the armature reaction has a negligible effect on commutation. Consequently, it is possible to make the field structure with a continuous ring of magnetic material around the outside of the air gap of the machine. This ring of material is made thin at the midpoints between poles adjacent the air gap so that a minimum of leakage flux results.

This continuous ring eliminates a phenomenon commonly referred to in conventional high speed motors as "slot ripple" and which appears in a torque motor as a variation of torque with rotor angle, termed a reluctance torque effect.

In previous machines, this effect has been eliminated by skewing the slots approximately one slot pitch. The present structure is easier to manufacture than the conventional skewed slot and also reduces the reluctance torque effects to an extent not previously possible. Furthermore, the commutator bar structure of the present invention is most desirably used with an unskewed rotor.

In assembling the torquer of the present invention, the field is assembled in the housing 10 and the armature is assembled on the hub 18 as described above. The bearing 16 is then assembled with the hub 18 and the snap ring 19 applied to the outer race to hold the bearing in place. The armature assembly may then be inserted in the housing 10, with the inner race 15 of the bearing on its seat 14a. The clamping plate 37 is then inserted through the open end of the hollow hubs and the bolt 38 and nut 39 are then applied to clamp the entire assembly together. The unit may be disassembled by reversing this process.

The bearing 16 carries the entire load of the supported parts as well as the armature. For example, in Fig. 1, the bearings 16 of the torques 4 and 5 carry all the weight of the gimbal ring 2 and the structures supported thereon. The bearing is approximately aligned with a plane passing through the axial center of the air gap. Furthermore, substantially the full axial length of the inner race is supported on seat 14a. Because of these arrangements there is little or no tendency for the bearing to bind or to be subjected to thrust or twisting forces. This alignment also precludes the possibility of interference between the armature and field at the air gap during shipment and prior to final assembly with supporting and supported elements. The rapidity of response of the device to electrical signals is thereby enhanced.

While we have shown and described a preferred embodiment of our invention, other modifications thereof will readily occur to those skilled in the art, and we therefore intend our invention to be limited only by the appended claims.

We claim:

1. An armature for an electric machine, comprising a cylindrical core having transverse slots in a cylindrical surface thereof, said core having portions overhanging and partly closing said slots, the radius between said surface and the core axis determining the overall diameter of the armature, winding coils in said slots and having coil ends extending beyond said slots, insulation means covering said coil ends, said insulation means, said coil ends and said core determining the overall axial length of the armature, wedge bars in said slots adjacent said overhanging portions, said bars having end portions projecting from corresponding ends of said slots and overlying said coil ends within said overall diameter and said overall axial length, said wedge bar end portions serving as commutator segments, and means electrically connecting said bars and said winding coils.

2. An armature as defined in claim 1, in which said projecting end portions of said bars are thicker than the portions within said slots, and extend laterally beyond said slots.

3. An electric machine, including: an armature comprising a cylindrical core having straight transverse slots in a cylindrical surface thereof and parallel to the axis thereof, said core having portions overhanging and partly closing said slots, the radius between said surface and the core axis determining the overall diameter of the armature, winding coils in said slots and having coil ends extending beyond said slots, insulation means covering said coil ends, said insulation means, said coil ends, and said core determining the overall axial length of the armature, straight wedge bars in said slots adjacent said overhanging portions, said bars having straight end portions projecting from corresponding ends of said slots and overlying said coil ends within said overall diameter and said overall axial length, said wedge bar end portions serving as commutator segments, and means electrically connecting said bars and said winding coils, said cylindrical surface defining one side of an air gap; and a field structure comprising a continuous ring of magnetic material defining the other side of the air gap, said ring being effective to provide a path for the field flux having a reluctance which is substantially uniform in all the armature positions thereby preventing the "slot ripple" effects commonly associated with straight slot machines.

4. An electric machine as defined in claim 3, in which said ring has recesses formed therein on the side opposite the air gap, and permanent magnets in said recesses.

5. A field structure as defined in claim 4, comprising a housing encircling said ring and holding said magnets in said recesses.

6. An electric machine, including: an armature comprising a cylindrical core having straight transverse slots in a cylindrical surface thereof and parallel to the axis thereof, said core having portions overhanging and partly closing said slots, the radius between said surface and the core axis determining the overall diameter of the armature, winding coils in said slots and having coil ends extending beyond said slots, insulation means covering said coil ends, said insulation means, said coil ends, and said core determining the overall axial length of the armature, straight wedge bars in said slots adjacent said overhanging portions, said bars having straight end portions projecting from corresponding ends of said slots and overlying said coil ends within said overall diameter and said overall axial length, said wedge bar end portions serving as commutator segments, and means electrically connecting said bars and said winding coils, said cylindrical surface defining one side of an air gap; and a field structure comprising means defining the other side of the air gap and providing a path for the field flux having a reluctance which is substantially uniform in all the armature positions, thereby preventing the "slot ripple" effects commonly associated with straight slot machines.

7. An armature for an electric machine, comprising a cylindrical core having straight transverse slots in a cylindrical surface thereof, said core having portions overhanging and partly closing said slots, the radius between said surface and the core axis determining the overall diameter of the armature, winding coils in said slots and having coil ends extending beyond said slots, insulation means covering said coil ends, said insulation means, said coil ends and said core determining the overall axial length of the armature, straight wedge bars in said slots adjacent said overhanging portions, said bars having straight end portions projecting from corresponding ends of said slots and overlying said coil ends, said end portions defining parts of a cylindrical commutating surface entirely within said overall diameter and said overall axial length, and means electrically connecting said bars and said winding coils.

8. An electric machine, including: an armature comprising a cylindrical core having straight transverse slots in a cylindrical surface thereof and parallel to the axis thereof, said core having portions overhanging and partly closing said slots, the radius between said surface and the core axis determining the overall diameter of the armature, winding coils in said slots and having coil ends extending beyond said slots, insulation means covering said coil ends, said insulation means, said coil ends, and said core determining the overall axial length of the armature, straight wedge bars in said slots adjacent said overhanging portions, said bars having straight end portions projecting from corresponding ends of said slots and overlying said coil ends, said end portions defining parts of a cylindrical commutating surface entirely within said overall diameter and said overall axial length, means electrically connecting said bars and said winding coils; and a brush rigging radially aligned with said commutating surface and located entirely within said overall axial length, and brushes on said rigging cooperating with said commutating surface.

9. An electric machine, including: an armature comprising a cylindrical core having straight transverse slots in a cylindrical surface thereof and parallel to the axis thereof, said core having portions overhanging and partly closing said slots, the radius between said surface and the core axis determining the overall diameter of the armature, winding coils in said slots and having coil ends extending beyond said slots, insulation means covering said coil ends, said insulation means, said coil ends, and said core determining the overall axial length of the armature, straight wedge bars in said slots adjacent said overhanging portions, said bars having straight end portions projecting from corresponding ends of said slots and overlying said coil ends, said end portions defining parts of a cylindrical commutating surface entirely within said overall diameter and said overall axial length, said cylindrical core defining one side of an air gap, and means electrically connecting said bars and said winding coils; a brush rigging radially aligned with said commutating surface and located entirely within said overall axial length, and brushes on said rigging cooperating with said commutating surface; and a field structure supporting said brush rigging and comprising means defining the other side of the air gap and providing a path for the field flux having a reluctance which is substantially uniform in all the armature positions, thereby preventing the "slot ripple" effects commonly associated with straight slot machines.

References Cited in the file of this patent

UNITED STATES PATENTS

| | | |
|---|---|---|
| 1,416,256 | Borger | May 16, 1922 |
| 1,546,664 | Landers | July 21, 1925 |
| 1,756,501 | Apple | Apr. 29, 1930 |
| 1,793,986 | Apple | Feb. 24, 1931 |
| 2,298,862 | Balz et al. | Oct. 13, 1942 |
| 2,416,300 | Godsey | Feb. 25, 1947 |
| 2,423,345 | Roters | July 1, 1947 |
| 2,465,820 | Sharrow et al. | Mar. 29, 1949 |
| 2,553,292 | Barrett | May 15, 1951 |
| 2,590,255 | LeTourneau | Mar. 25, 1952 |
| 2,595,268 | Kellogg | May 6, 1952 |
| 2,615,944 | Carlson | Oct. 28, 1952 |
| 2,624,856 | Younger | Jan. 6, 1953 |
| 2,756,354 | Baron | July 24, 1956 |

FOREIGN PATENTS

| | | |
|---|---|---|
| 848,667 | Germany | Sept. 8, 1952 |